3,268,882
ELECTROMAGNETIC THERMAL SENSING SYSTEM

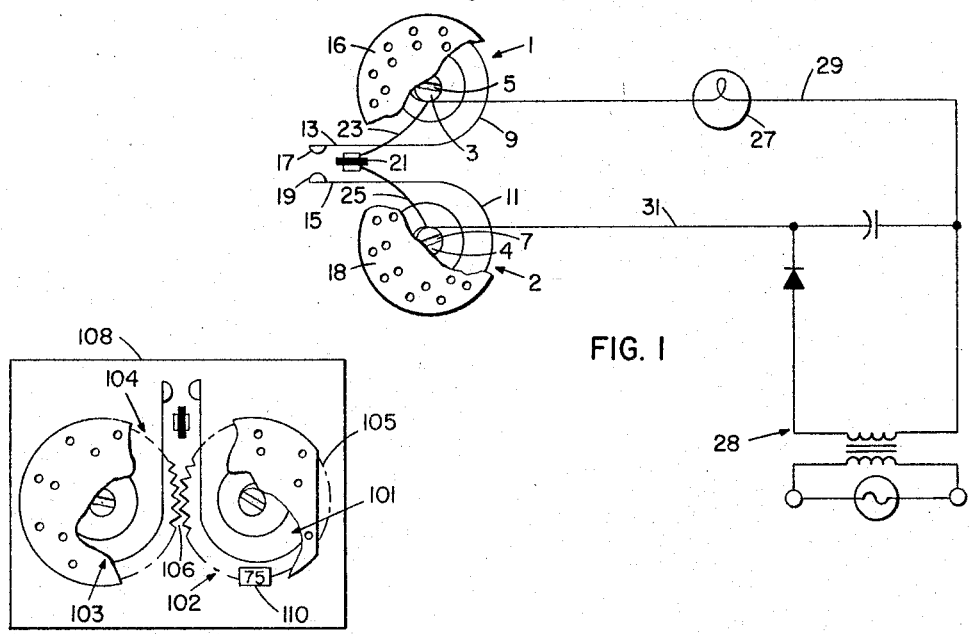
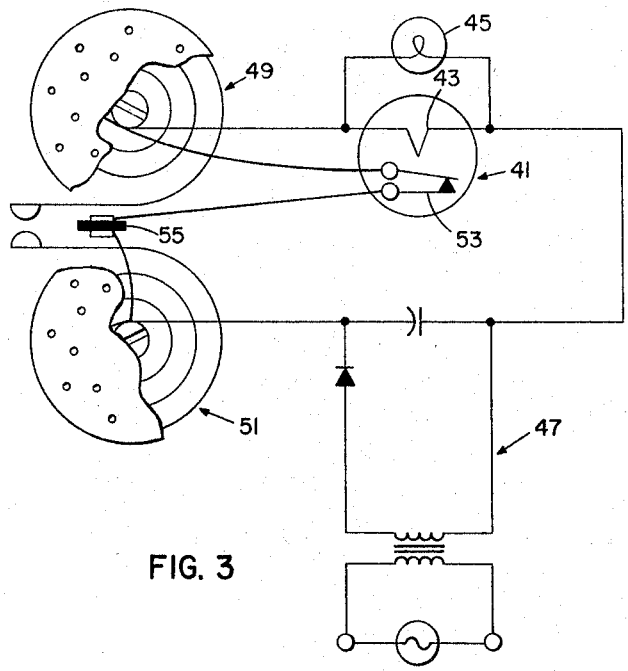
Aug. 23, 1966     G. W. HOEL     3,268,882
ELECTROMAGNETIC THERMAL SENSING SYSTEM
Filed April 27, 1964
FIG. 1
FIG. 2
FIG. 3
Gordon W. Hoel,
*INVENTOR.*
BY Harry M. Saragovitz
Edward J. Kelly
Herbert Berl
James E. Staudt

Gordon W. Hoel, Mendota Heights, Minn., assignor, by mesne assignments, to the United States of America as represented by the Secretary of the Army
Filed Apr. 27, 1964, Ser. No. 365,557
4 Claims. (Cl. 340—227)

The present invention relates to a thermostatically controlled system for detecting temperature variations. This device is especially useful in computers and various missile systems in which a minimum temperature variation is required.

It is well known that several thermostatic warning systems are in general use at this time. However, this invention is believed to be more accurate and less expensive than previous systems of this type.

In general the present invention is concerned with temperature sensing units of the type which are actuated by a bimetallic strip composed of metals having differing expansion characteristics. Devices of this general type are also used in electrical thermostats to control home heating plants. In such a system when a temperature change occurs the two metals in the conventional control element expand at different rates thereby causing the bimetallic strip to deflect so as to make or break electrical contacts which either activate or deactivate the heating plant.

The present invention differs from the conventional temperature control unit in that it employs a pair of bimetallic strips which cooperate to make the temperature response of a warning system more sensitive. In addition, to increase the responsive sensitivity even more, an electromagnetic device facilitates contact closure when a critical temperature is reached. The use of an electromagnet also causes the electrical contacts to close very quickly after reaching a predetermined point thus reducing arcing between the contacts, which form a most important part of the circuit. It will be seen that the life of the contact surfaces will be greatly increased.

Another important aspect of my invention is the use of a thermal time delay relay to discontinue operation of the electromagnet after a predetermined time lapse thus allowing the system to return to is inoperative condition, provided the temperature has returned to normal. The invention also contemplates a signal means which, under most conditions, will be operated upon closing of the electrical contacts. Thus, by the use of dual elements and the electromagnet, an accurate system is provided without the use of expensive ultra-sensitive individual components.

One object of this invention is, therefore, to provide an extremely accurate and economical system for warning of temperature variations.

Another object is to provide a thermostatic control device wherein means are provided to facilitate rapid contact closure thereby lengthening the life of the electrical contacts of the system.

Another object of the invention is to provide an intermittent warning of a slight temperature variation and a constant warning of a greater temperature variation.

Yet another object of this invention is to provide a device which will return to its original position when the temperature variation is eliminated.

These and other objects and advantages of the present invention will become apparent from the following description taken in conjunction with the accompanying drawings, wherein:

FIGURE 1 is a schematic showing of the circuit of one embodiment of the invention;

FIGURE 2 is a plan of the temperature responsive elements of the device mounted on adjustable supports which in turn are mounted in an enclosure; and FIGURE 3 is a schematic showing of one embodiment of the invention wherein a thermal time delay relay is utilized to deactivate a portion of the system.

The temperature responsive portion of the present invention consists of two spiral bimetallic elements 1 and 2 which are attached to supports 3 and 4 at their respective inner ends 5 and 7. These elements also comprise spiral portions 9 and 11 which commence at inner ends 5 and 7 and terminate in free end portions 13 and 15 respectively. The spiral portions are enclosed in ventilated protective housings 16 and 18 which are illustrated partly cut away in each of the figures of the drawing. The distal ends of free end portions 13 and 15 are provided with electrical contacts 17 and 19, each of which faces the other and is directly opposite therefrom so as to make electrical connection upon expansion of the bimetallic elements. The circuitry of the system includes an electromagnet 21 which is located intermediate free end portions 13 and 15. The electromagnet is connected electrically to the bimetallic elements which in turn are connected in series with a signal lamp 27 and a power supply 28 by means of conductors 29 and 31.

In order to provide a more versatile device bimetallic elements 101 and 103, as illustrated in FIGURE 2, are fixed to a pair of rotatable support wheels 102 and 104 which are interconnected by means of cogged portions as illustrated at 106. An enclosure 108 surrounds the support wheels except for a small portion 105 of wheel 102 which protrudes therefrom for adjustment purposes. By rotating support wheel 102 the desired temperature may be brought in window 110 and separation of the contacts will be adjusted so as to cause contact closure when the temperature reaches the preset level indicated in the window.

The embodiment illustrated in FIGURE 3 is similar to that of FIGURE 1 with the addition of a thermal time delay relay 41 which consists of a relay heater element 43 which is connected in parallel with a signal lamp 45 and in series with the conductor between power supply 47 and bimetallic elements 49 and 51. Immediately adjacent the heater element is located a bimetallic heat responsive switch 53 which is connected in series between element 49 and electromagnet 55.

In operation of the system illustrated in FIGURE 1 each of the spiral temperature responsive elements 1 and 2 will react to temperature changes by deflecting in a manner which will cause the spiral elements to wind or unwind. In response to a predetermined change, for example, a temperature rise, the elements may be designed to unwind thereby closing contacts 17 and 19. The bimetallic elements may be designed to close in response to a temperature increase or decrease dependent upon whether maximum or minimum temperature is to be indicated by the warning system. Actual closure of the contacts will be hastened by operation of the electromagnet which is located midway between the contact members as shown. Being critically spaced the contacts will normally be brought together in unison with a sharp action that will improve temperature control and reduce arcing between the contacts. The gap between the contacts is smaller than the gap between the electromagnet and either of the end portions 13 and 15, thereby assuring contact closure even though only one end portion should come within the effective area of the electromagnet. The signal lamp provides a warning signal which indicates an abnormal temperature change. During the open position of contacts 17 and 19 the electromagnet will be in operation. Due to the high resistance of the electromagnet the amount of current passing through the signal lamp will be insufficient to cause it to light. Closure of the contacts results in a completed circuit around the electromagnet thus eliminating this resistance and thereby lighting signal lamp 27. Completion of the circuit by closure of the contacts eliminates the action of electromagnet for that period of time which the points are closed. Thus during an initial or slight temperature change the contacts will open and close rapidly until they are caused to remain open or closed in the event that the temperature change continues to an extreme or returns to normal. From the above it will be noted that a slight temperature change will result in a rapid flashing of lamp 27 while an extreme change will cause the lamp to burn steadily.

As pointed out above, the operation of the device shown in FIGURE 2 is merely an adjustment of the device illustrated in FIGURE 1 or FIGURE 3 in that it provides a means for selecting the temperature at which a warning is desired.

The operation of the modification shown in FIGURE 3 is similar to that of FIGURE 1 except that the system is further provided with a time delay relay which will under conditions of continued abnormal temperatures, open the electromagnetic circuit for a predetermined period of time thereby allowing the contacts to open in a steady state when and if the temperature cycle reverses. More specifically, upon closure of the contacts the relay heater element 43 as well as signal lamp 45 will be actuated. Heater element 43 is well insulated from the main temperature responsive area of the system to prevent false warnings when the heater is in operation. The bimetallic heat responsive switch 53, being located in close proximity to the heater, will respond to the temperature increase caused when the heater is operative by opening the circuit between thermostatic element 49 and the electromagnet thus rendering the electromagnet inactive even though the contacts may have reopened. Assuming the system temperature variation effecting the spiral bimetallic element has not been of such a degree to maintain the contacts closed, the interruption of the forces of the electromagnet will allow them to reopen and remain reopened until the electromagnet is again actuated by closure of bimetallic heat responsive switch 53. If at this time the temperature remains in the danger area the free end portions of elements 49 and 51 will remain within the effective field of the electromagnet and the contacts will be caused to close again thus repeating the warning signal. If the temperature no longer remains in the danger area the end portions of the temperature responsive elements will have moved out of the effective area of the electromagnet, the points will remain open and the signal lamp will remain inactive thus indicating the temperature of the system is once again within its operable limits.

It is apparent that in addition to operation of a warning light the present system may be utilized to initiate operation of a safety or temperature corrective mechanism. For example, an air conditioner or a heater may be used to eliminate an abnormal temperature existing in a missile or any device in which one desires.

While the foregoing is a description of the preferred embodiments the following claims are intended to include those modifications and variations that are within the spirit and scope of my invention.

I claim:
1. A thermally responsive signal system comprising: a a pair of opposed temperature responsive elements, each of said elements having one end thereof fixed and the other end free, the free end of each of said elements having a contact facing the opposite element, said contacts extending in a common plane toward each other, directly opposite and spaced a predetermined distance from each other so as to simultaneously move toward or away from each other in said plane in response to operation of said temperature responsive elements, electromagnetic coil means positioned intermediate said element near the free end portions thereof for directly magnetically attracting said free end portions so as to bring the contacts together when said free ends come within a predetermined distance of the electromagnet during operation thereof, power supply means connected to said temperature responsive elements, conductor means connecting said elements to said electromagnet, and a signal lamp connected in series between said elements and said power supply means.

2. A device as set forth in claim 1 wherein the fixed ends of said temperature responsive elements are mounted on a pair of rotatably moveable supports, said supports being interconnected so as to rotate in unison thereby adjusting the space between said contacts while maintaining an equal spacing between said electromagnet and each of said elements.

3. A temperature responsive warning system comprising: a pair of identical temperature responsive elements, each of said elements having an inner end portion, a spiral portion and a free end portion, the inner end of each of said elements being attached to a support, the free end of each of said elements being spaced from the free end of the other of said elements and terminating intermediate the spiral portions of said elements, each of said elements having an electrical contact on its free end, each of said contacts being opposite and spaced from the other so as to move toward or away from the other in response to actuation of said temperature responsive elements, an electromagnet located adjacent said contacts and intermediate said free end portions, a power supply means, means connecting said power supply means to said elements, conductor means connecting said elements to said electromagnet, a heating element connected in series with said power supply connecting means, a signal light connected in parallel with said heating element, said heating element and said signal light being operative only when said contacts are closed, a temperature responsive switch means connected in series with one of said means connecting said elements to said electromagnet, said switch means being located adjacent said heating element so as to open upon heating thereof thus interrupting the flow of current from said power supply to said electromagnet.

4. The invention recited in claim 2 wherein the rotatable supports include a pair of intermeshing gear wheels and the temperature responsive elements each include a spiral portion intermediate the free and fixed ends thereof.

References Cited by the Examiner
UNITED STATES PATENTS
2,575,883   11/1951   Mateer.

NEIL C. READ, *Primary Examiner.*

R. M. ANGUS, D. YUSKO, *Assistant Examiners.*